United States Patent [19]

Maklad

[11] Patent Number: 4,764,194

[45] Date of Patent: Aug. 16, 1988

[54] METHOD OF MANUFACTURING HOLLOW CORE OPTICAL FIBERS

[75] Inventor: Mokhtar S. Maklad, Milford, Conn.

[73] Assignee: EOTec Corporation, New Haven, Conn.

[21] Appl. No.: 876,272

[22] Filed: Jun. 19, 1986

[51] Int. Cl.$^4$ .................... C03C 25/02; C03B 24/04; C03B 37/02

[52] U.S. Cl. ........................ 65/3.11; 65/3.2; 65/13

[58] Field of Search ............... 65/3.1, 3.11, 3.2, 13, 65/36, 40; 350/96.32, 96.34, 320

[56] References Cited

U.S. PATENT DOCUMENTS

| | | | |
|---|---|---|---|
| 3,950,073 | 4/1976 | Horiguchi et al. | 65/3.11 |
| 4,067,709 | 1/1978 | Stanton | 65/13 |
| 4,133,664 | 1/1979 | Auuch et al. | 65/13 |
| 4,289,516 | 9/1981 | Krohn | 65/3.11 |
| 4,326,869 | 4/1982 | Kurosaki et al. | 65/3.11 |
| 4,372,767 | 2/1983 | Maklad | 65/3.11 |
| 4,453,803 | 6/1984 | Hidaka et al. | 350/96.34 |
| 4,578,096 | 3/1986 | Siegmund | 65/3.11 |

Primary Examiner—Kenneth M. Schor
Assistant Examiner—Michael K. Boyer
Attorney, Agent, or Firm—Donald M. Sell; Stephen W. Buckingham

[57] ABSTRACT

A method for manufacturing hollow core optical fibers is disclosed comprising continuously feeding a glass rod of the desired cladding composition into a high temperature furnace with the rod in line contact with the inner surface of the glass tube. The glass transition temperature of the rod is substantially lower than the glass transition temperature of the glass tube. The glass rod composition is uniformly distributed on the glass tube inner wall as it enters the furnace hot zone. The ratio of the rod diameter to the glass tube inner diameter and the drawing temperature determine the coating thickness of the glass cladding on the inner surface of the glass tube. As the coated tube is passed through the furnace hot zone peak, the optical fiber is drawn. The rod and tube feed rate, the drawing temperature of the rod and glass tube and the drawing rate of the coated glass tube are selected to yield a hollow core optical fiber, with preselected interior and exterior diameters.

10 Claims, 1 Drawing Sheet

METHOD OF MANUFACTURING HOLLOW CORE OPTICAL FIBERS

BACKGROUND OF THE INVENTION

This invention relates to optical fibers (or optical waveguides), and more particularly, to a method of manufacturing hollow core optical fibers.

Known optical fibers comprise a glass core surrounded by a glass cladding layer. The core is assumed to have a refractive index N1, and the cladding N2. If the relationship N1>N2 is satisfied, light rays entering the fiber are totally internally reflected when the angle of incidence exceeds the critical angle. The light can be transmitted through the fiber to a distant place, being entrapped within the core, enabling transmission with low loss.

The optical fibers for present lightwave systems are made of silica glass containing dopants such as $GeO_2$ (germanium dioxide). Dopants produce small changes in the refractive index of the glass. By doping the fiber core to a higher refractive index than the surrounding cladding material, a wider variety of materials can be employed to manufacture optical fibers without increasing transmission losses.

In order to minimize transmission losses in optical fibers, many different techniques have been proposed. Transmission losses are due to intrinsic glass scattering and absorption impurity absorption, cladding loss, core/cladding imperfections and geometry loss. Impurity absorption losses occur because transition metal ions and OH groups in the glass absorb light. Scattering loss is due to imperfections in the fiber core, such as bubbles, microcracks and debris as well as composition and density fluctuations. Cladding losses are caused by imperfections at the core-cladding interface. Geometry loss occurs because of bends in the fiber and is an inverse function of the numerical aperture.

U.S. Pat. No. 4,163,654 to Krohn et al. (incorporated by reference) describes various methods for manufacturing optical fibers, including the double crucible process and the chemical vapor disposition process. These proceses generally attempt to overcome some of the problems inherent in fiber manufacturing methods which severely limit the selection of glass compositions used in the manufacturing of optical fibers. U.S. Pat. No. 4,372,767 to Maklad (incorporated by reference) discloses a process for manufacturing low loss optical fibers which overcomes or at least minimizes the above-mentioned transmission losses and is well suited to the production of a low loss optical fiber with an improved index profile.

The $CO_2$ gas laser emits light in the infrared band region of the spectrum and is widely used for laser machining due to its high efficiency and relatively low cost. Hidaka, et al. disclosed in U.S. Pat. No. 4,453,803 that hollow core optical fibers comprising $GeO_2$.-$ZnO.K_2O$ cladding compositions can efficiently transmit light in the infrared band and thus can be used with a $CO_2$ laser with minimal transmission loss. The air core (with refractive index roughly equal to one) is surrounded by glass having a refractive index less than one, thus constituting a true optical waveguide. Transmission loss can be minimized and the fiber tailored to the particular wavelength of light to be used by judiciously controlling the amounts of the additive and the stabilizing components to be incorporated into the glass.

The hollow core fiber has many advantages:

The optical fiber has excellent endurance with respect to high energy beam transmissions due to its hollow core and it displays high mechanical, thermal and chemical stability.

Since the fiber is made from a stable glass oxide, it cannot undergo further degradation of quality and will not undergo loss due to deliquescence and entry of impurities.

Due to its hollow core, the fiber can be subjected to forced air cooling by the passage of cooling air through the hollow core.

Most glass compositions are mechanically weaker and more susceptible to moisture attack than fused silica. This drawback makes the use of other glass compositions for hollow core fiber manufacture less suitable for industrial and medical applications where the flexibility of the fiber is the major advantage. Hidaka (op. cit.) has disclosed that pure $GeO_2$ glass is such that a hollow core optical fiber made of this material gives the lowest possible transmission loss at the wavenumber of 765 $cm^{-1}$. The $CO_2$ laser beam transmits at a wavelength of 940 $cm^{-1}$. Wavenumbers can be adjusted by adding alkali metal oxides (e.g., $K_2O$) to pure $GeO_2$, but when added alone beyond a certain level, the glass assumes a deliquescence, which deprives it of its utility. Therefore, a third component, another oxide (ZnO, BaO or $ZrO_2$), is added to divest the glass of its deliquescence. The resultant hollow core optical fiber can now transmit light of the middle infrared band, having a wavenumber optimum of 975 $cm^{-1}$ to 900 $cm^{-1}$ with transmission loss of not more than 0.2 db/M at 940 $cm^{-1}$.

To apply this knowledge for the manufacture of hollow core optical fibers, a new process is disclosed wherein the inside of a high silica fiber is coated during the drawings process with desired glass cladding compositions necessary for infrared light guidance, providing a low loss, hollow core optical fiber for laser transmissions.

OBJECTS OF THE INVENTION

The principal object of the invention is to provide a process for manufacturing hollow core optical fibers.

The more specific object of this invention is to provide a process for manufacturing low loss, hollow core optical fibers which can transmit light in the infrared band.

A second object of this invention is to provide a method for producing a low loss hollow core optical fiber with an improved refractive index profile accurately tailored for infrared transmissions.

A further object of this invention is to provide a method for producing a low loss hollow core optical fiber with increased flexibility, suitable for industrial and medical applications.

These and other objects of the present invention will be apparent to those skilled in the art in light of the present description, accompanying claims and appended drawings.

SUMMARY OF THE INVENTION

In accordance with the present invention, a glass rod of the desired cladding composition and a glass tube are continuously fed into a high temperature furnace with the rod in line contact with the inner surface of the glass tube, the glass transition temperature of the rod being substantially lower than the glass transition temperature of the glass tube. The glass rod composition is uniformly distributed on the glass tube inner wall as it enters the furnace hot zone. The ratio of rod diameter to the glass tube inner diameter and the drawing temperature determine the coating thickness of the glass cladding on the inner surface of the glass tube. As the coated tube is passed through the furnace hot zone peak, the optical fiber is drawn. The rod and tube feed rate, the drawing temperature of the rod and glass tube and the drawing rate of the coated glass tube being selected to yield a hollow core optical fiber, with preselected interior and exterior diameters.

The outer glass tube renders the fiber mechanically strong and chemically stable. To reduce the thermal expansion mismatch between the glass rod and the glass tube, a graded seal is deposited utilizing the modified chemical vapor deposition (MCVD) process. The invention is well suited to the production of low loss hollow core optical fibers for use with the infrared $CO_2$ and various lasers.

DETAILED DESCRIPTION

Figure 1:
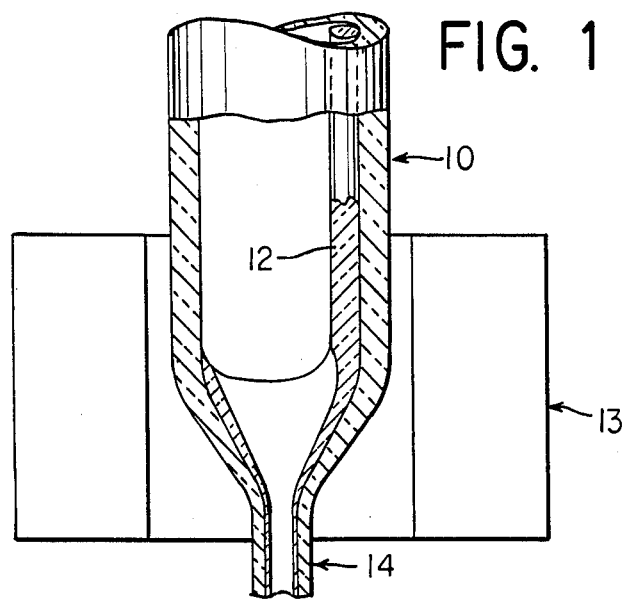
FIG. 1 shows diagrammatically the apparatus and materials used to produce the hollow core optical fibers of the present invention.

Referring to the drawings, a glass tube 10 made of the desired refractory glass material (i.e., capable of enduring high temperature and resistant to deliquescence) is opened at its lower end. A commercially available, high purity, fused silica tube may be used as tube 10 or alternatively tube 10 may be formed of a high silica sodium borosilicate material (e.g., Vycor).

Figure 2:
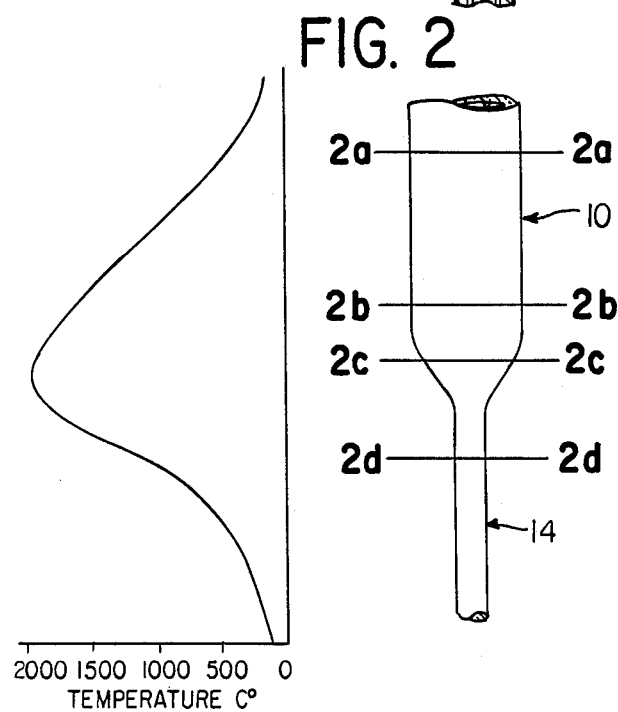
FIG. 2a-d show cross sections of the composite structure of the hollow core optical fibers as the tube passes through the furnace and is drawn into the resultant hollow core optical fibers.
Figure 2A:
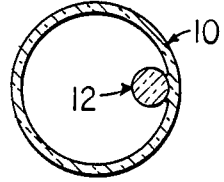
Figure 2B:
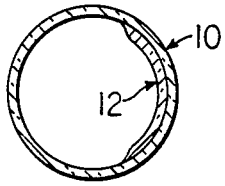
Figure 2C:

A glass cladding rod 12 is inserted in the tube. In the discussion below, the cladding is the coating on the inner wall of the silica substrate tubing. The composite structure is then inserted in a high temperature furnace 13 for hollow core fiber drawing. The temperature profile of the furnace hot zone is shown in the left of FIG. 2, which has a temperature peak close to the center of the heating element. In addition, the profile is distorted in the upper zone. The heating element in the furnace may, for example, contain graphite resistance heating, induction heating and/or laser heating devices.

Figure 2D:

As the glass rod enters the hot zone it softens, adheres to the tube side and flattens. Cross-sections of this are shown in FIGS. 2, a-d. As the temperature increases, the viscosity decreases and the glass spreads over the inner wall of the glass tube and eventually covers it entirely with a thin glass layer as shown in FIGS. 2, a-d. This coating takes place while the refractory tube size stays substantially the same. As the coated tube is drawn through the hot zone peak, it is attentuated in size and eventually reaches the desired diameter as shown in FIG. 2d.

The drawn fiber may be coated in line with flexible plastic to protect the pristine high strength of the silica outer surface.

There are two major forces which control the glass coating process. These are the viscosity and the wetting angle of the glass rod on the glass tube. The forces due to viscosity will overcome the surface tension forces and enable a thin film to wet substantially the entire circumference of the inner surface of the glass tube. As the glass rod melts, it wets the inner surface of the substrate tube along its length in the form of a thin film which is easily fined into a high purity clear glass.

Temperature also effects the glass coating process. As the temperature increases the viscosity and the surface tension decrease. This condition assists in the spreading of a uniform coating on the inside of the glass tube surface. A low contact angle between the rod and the glass tube indicates composition compatibility between the glass rod and the tube surface and a lowering of the surface tension.

The coating thickness is controlled by the glass rod diameter, the glass tube inner diameter, the type of refractory glass tube and the drawing temperature. The coating thickness can be calculated geometrically from the tube and the rod cross-section. The ratio of the rod and the tube cross-section areas in the starting material is equivalent to the ratio of the cross-sections of the coating and the tube in the final product. Increasing the temperature causes the tube inner diameter to outer diameter ratio to decrease and eventually closes the tube and forms a melt pool, which is not desirable in this case. To avoid melt pool formation and tube collapse, the fiber drawing temperature should be maintained at as low a value as possible. This temperture corresponds to viscosity ranges from $10^6$ to $10^8$ poises and is equivalent to about 1800° C. to 2000° C., preferably 1900° C., for silica and 1600° C. to 1900° C. and preferably 1850° C. for borosilicate (Vycor). To ensure uniform coating thickness the glass rod viscosity should be between $10^2$ to $10^3$ poises and is equivalent to 900° C. for the cladding composition. The difference in the glass transition temperature between the rod and the glass tube is a critical parameter in this process and should be at least $10^1$-$10^2$ poises and preferably $10^4$ poises or more. The transition temperature (Tg) of the silica glass tube of the present invention is 1050° C. and that of borosilicate glass is 950° C. The Tg of a glass rod comprised of 10% $GeO_2$, 10% $K_2O$, 10% ZnO (see below) is 489° C. Thus, the difference in glass Tg's in this instance is 461° C. The difference in the Tg's of the rod and glass tubes should be at least 200° C. or more.

An example of a suitable glass rod composition is 80% $GeO_2$, 10% $K_2O$, 10% ZnO. All ratios are in mole percent. The thermal expansion of this glass is $89 \times 10^7$ cm/cm °C. and its softening point is 598° C. The thermal expansion is the dimensional change exhibited by solids, liquids and gasses for changes in temperature while pressure is held constant. The thermal expansion of the glass silica tube material is $5 \times 10^{-7}$ cm/cm °C. and its softening point is 1580° C. Vycor can also be used as a substrate glass tube. Its thermal expansion is $8 \times 10^{-7}$ cm/cm °C. and its softening point is 1500° C.

To reduce the thermal expansion mismatch that exists between the above coating and the glass tube (either silica or borosilicate), a graded seal is deposited utilizing the modified chemical deposition process (MCVD) prior to the coating and drawing process. The graded seal, which is deposited in layers on the inner wall of the glass tube, eliminates problems encountered when large thermal expansion mismatches occur between the rod and the glass tube, as in the present invention. In the absence of a graded seal, the resultant fibers are unstable, highly stressed and become subject to cracking.

In the MCVD method, disclosed in U.S. Pat. No. 4,372,767 to Maklad, the glass tube (silica glass in this case) is held in a rotating glass lathe. The glass tube is heated to a high temperature by a fire carriage. The fire carriage moves longitudinally along the length of the glass tube. As the fire carriage moves along the tube, one of the graded seal layers is deposited onto the tube inner wall. The component halides are entrained into the glass tube through a mass flow controller. The heat and the presence of oxygen oxidizes the halides into their respective oxides which then fuse to form a coating of glass on the glass tube. The graded seal which is deposited in the form of many layers on the glass tube is composed of borosilicate and the grading which is established runs from 5-20% boron.

The inner diameter to outer diameter ratio of the resultant hollow core fiber can be adjusted by adjusting the drawing rate and the temperature. If the drawing rate is kept constant, increasing the temperature will decrease the inner diameter to outer diameter ratio until it approaches zero, which would prevent formation of the hollow core. Therefore, the drawing temperature must be maintained within the above-described limits.

Alternatively, in order to maintain the hollow core fiber geometry, a positive pressure may be maintained inside the glass tube during the drawing process. This may be achieved by the passage of air through the hollow core. The higher the air flow, the higher the inside tube pressure.

Three factors determine the dimensions of the resultant hollow core fiber in the drawing process: the rate of insertion of the rod and the glass tube into the furnace; the rate of the drawing of the fiber; and the drawing temperature. An increase in the rate of the drawing of the hollow core fiber can be achieved by increasing the rate of insertion of the rod and the glass tube and increasing the temperature.

In a preferred embodiment a graded seal comprising borosilicate is deposited on the inside of the silica glass tube 10 using the MCVD process. An alternative graded seal is germano silicate.

The example presented above is for the production of a hollow core optical fiber suited for use with a $CO_2$ laser transmitting at the wavelength of 10.6 $\mu M$. Other glass compositions can be used in this process for the manufacture of hollow core optical fibers for use with lasers transmitting at other wavelengths, examples of which are presented below in Table I.

TABLE I

| Laser Type | Wavelength ($\mu M$) | Cladding Composition (Moles %) |
|---|---|---|
| Carbon Dioxide | 10.6 | 80% $GeO_2$.10% $K_2O$.10% ZnO |

TABLE I-continued

| Laser Type | Wavelength ($\mu M$) | Cladding Composition (Moles %) |
|---|---|---|
| Carbon Dioxide | 10.6 | $GeO_2$ (100%) |
| Carbon Monoxide | 5-7 | $SiO_2$ (100%) |
| Deuterium Flouride | 3.6-4 | $BeF_2$ (100%) |

The invention has been described above by reference to preferred embodiments. It is understood, however, that many additions, deletions and modifications will be apparent to one of ordinary skill in the art in light of the present description without departing from the scope of the invention, as claimed below.

What is claimed is:

1. A process for manufacturing hollow core optical fibers comprising continuously feeding a glass rod of the desired cladding composition and a glass tube into a furnace, with the rod in line contact with the inner wall of the glass tube, the glass transition temperature of said rod being substantially lower than the glass transition temperature of said substrate tube, applying heat to said tube and rod at a temperature which causes the rod to soften and spread over the tube inner wall and cover said inner wall entirely, passing the coated glass tube through the furnace hot zone peak and drawing said coated glass tube, the feeding rate of said glass rod and said glass tube, the drawing temperature of said glass rod and glass tube, and the drawing rate of said coated glass tube being selected to yield a hollow optical fiber, with preselected interior and exterior diameters.

2. The process according to claim 1, wherein the glass tube first has a graded seal deposited on said inner wall prior to the coating and drawing processes.

3. The process according to claim 2, wherein said graded seal comprises borosilicate.

4. The process according to claim 2 wherein said graded seal comprises germano silicate.

5. The process according to claim 2 wherein said graded seal is comprised of multicomponent glasses.

6. The process according to claim 1, wherein the transition temperature of said glass tube is at least 200 degrees centigrade greater than the transition temperature of said rod.

7. A process according to claim 1, wherein said cladding comprises 80% germanium dioxide, 10% potassium oxide and 10% zinc oxide.

8. The process according to claim 1, wherein said cladding comprises germanium dioxide.

9. The process according to claim 1, wherein said cladding comprises silicon dioxide.

10. The process according to claim 1, wherein said cladding comprises beryllium fluoride.

* * * * *